July 5, 1960  S. B. ATWOOD, JR  2,943,595
SPEEDOMETER
Filed May 13, 1958  3 Sheets-Sheet 1
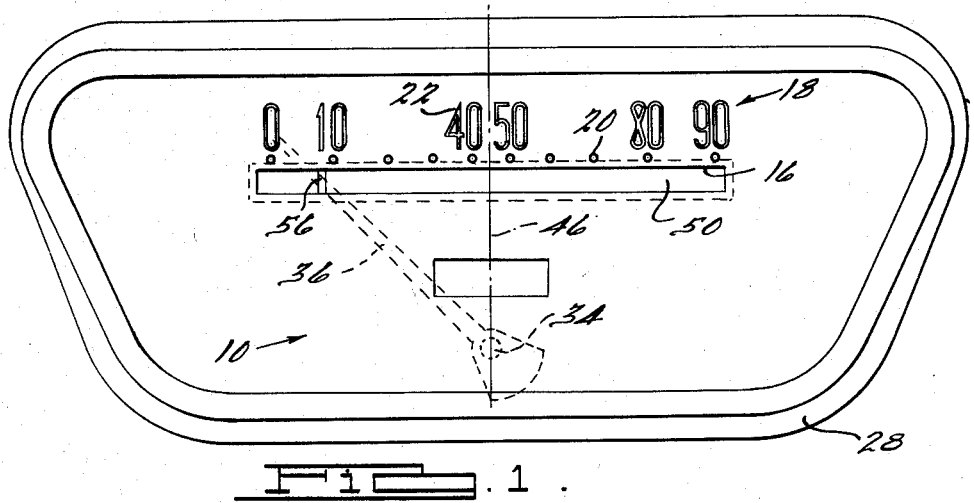
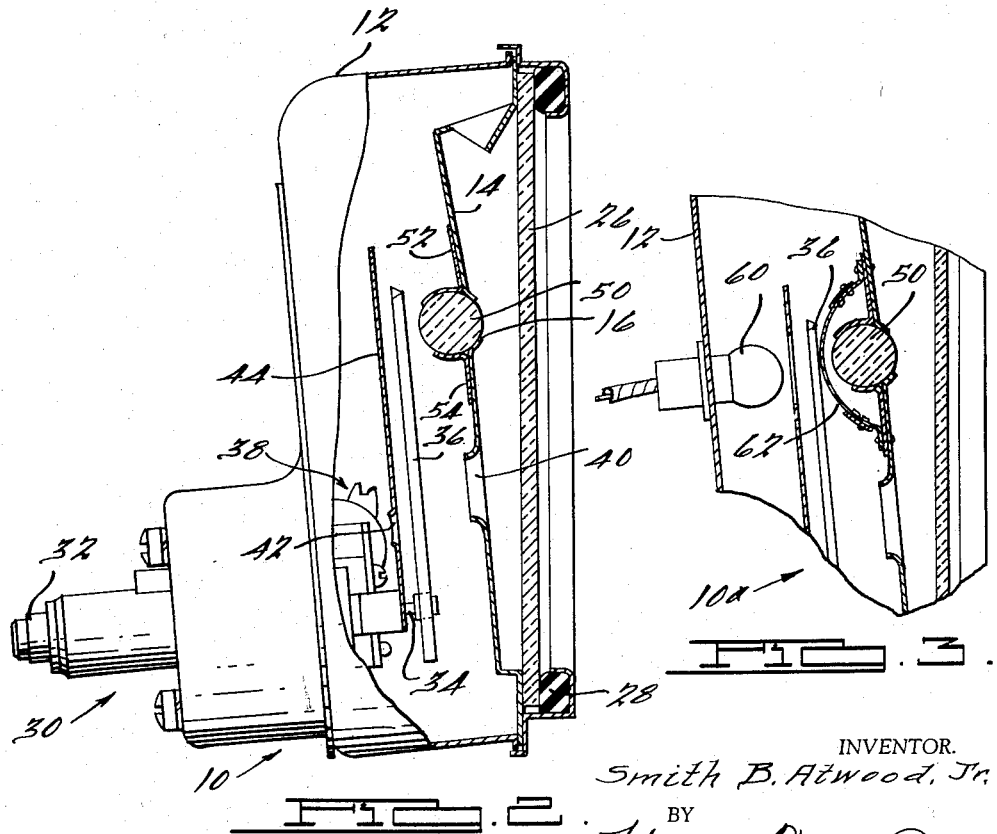
INVENTOR.
Smith B. Atwood, Jr.
BY
Harness, Dickey & Pierce
ATTORNEYS.

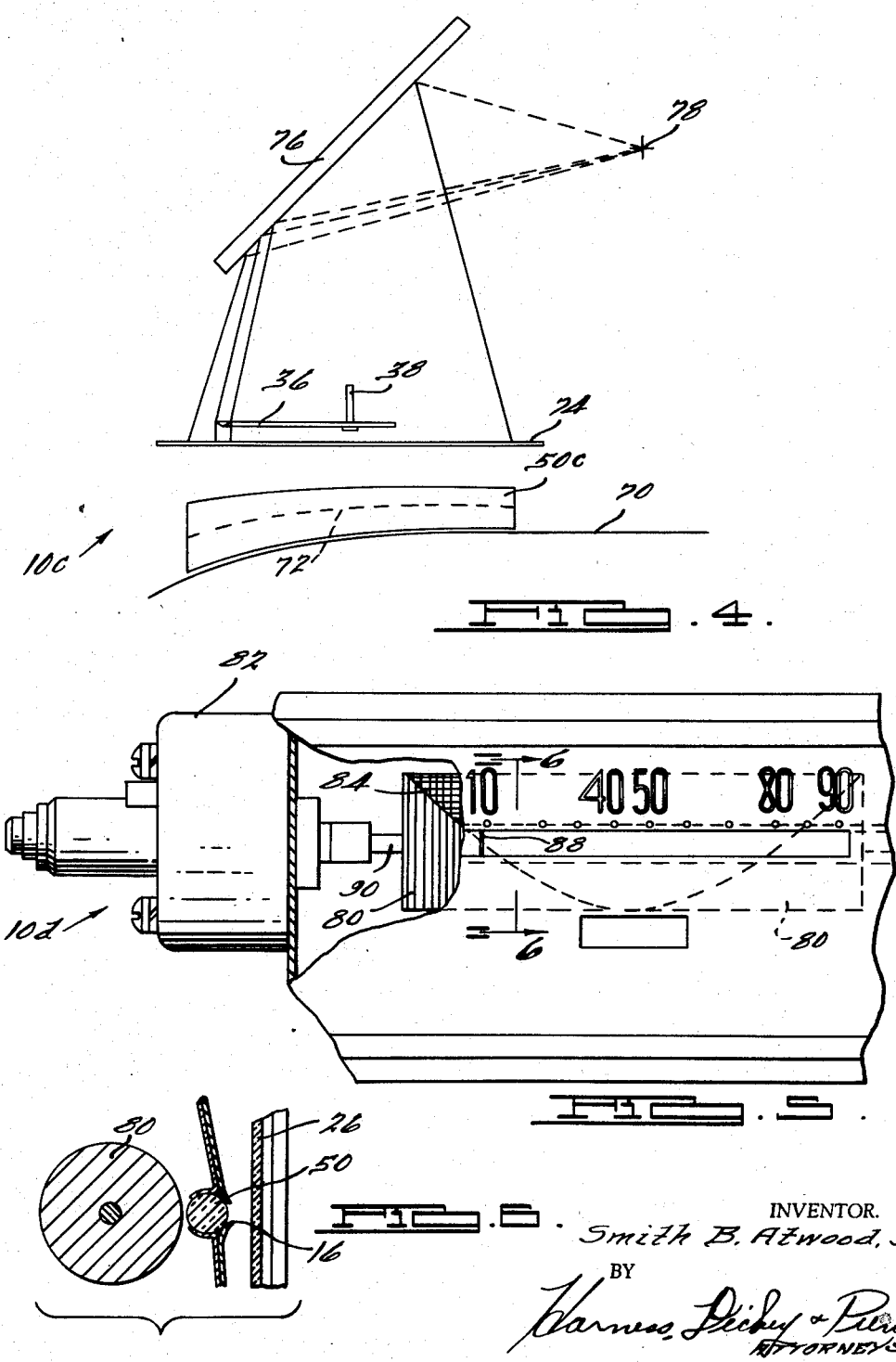

July 5, 1960
S. B. ATWOOD, JR
2,943,595
SPEEDOMETER
Filed May 13, 1958
3 Sheets-Sheet 3
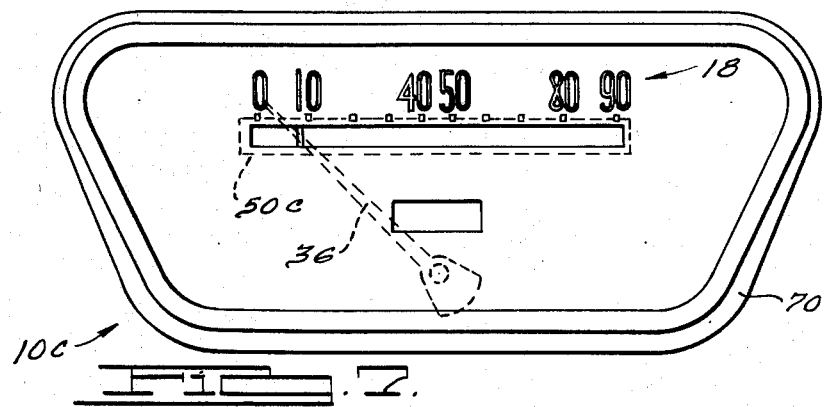
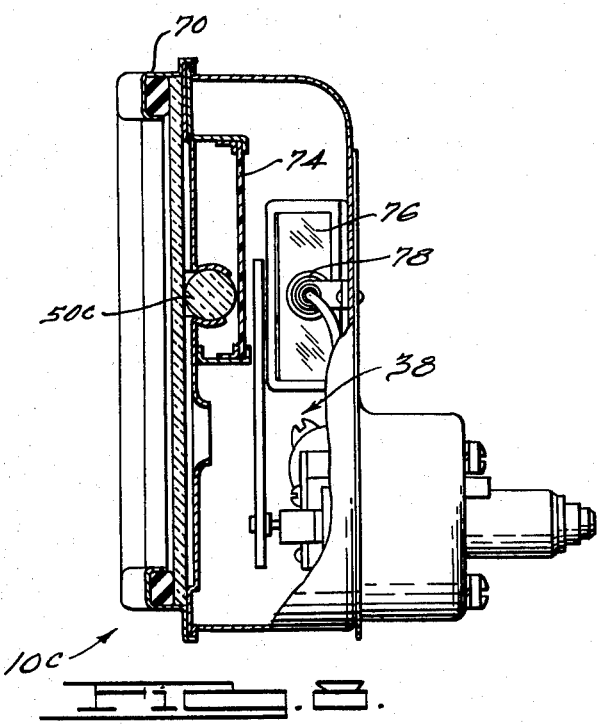
INVENTOR.
Smith B. Atwood, Jr.
BY
Harness, Dickey & Pierce
ATTORNEYS.

United States Patent Office 2,943,595
Patented July 5, 1960

2,943,595

SPEEDOMETER

Smith B. Atwood, Jr., Ann Arbor, Mich., assignor to King-Seeley Corporation, a corporation of Michigan Filed May 13, 1958, Ser. No. 734,939

5 Claims. (Cl. 116—116)

This invention relates generally to indicating or measuring devices and more particularly to a speedometer.

In conventional indicating devices having a rectilinear scale and an angularly movable indicating member or pointer, the indicating member intersects the scale at right angles only at one point, usually the midpoint of the scale. The indicating member intersects the remainder of the scale at angles which vary with the extent of angular movement of the indicating member. As a result, the exact scale reading is in doubt for all positions of the indicating member except the one position. Indicating devices of the type utilizing a spiral indicating line are subject to the same objection since the line is at all times inclined relative to the rectilinear scale. The use of lens for erecting the image of the indicating member so that it appears to be perpendicular to the scale at all times is well known. However, at the ends of the scale the images usually become so wide that they affect the accuracy of the reading.

An object of this invention, therefore, is to provide an improved indicating device of the above type which overcomes the disadvantages inherent in prior devices.

A further object of this invention is to provide an improved indicating device which incorporates improved means for associating an angularly movable pointer with a rectilinear scale so that the pointer at all times appears to be perpendicular to the scale and of a size to give an accurate scale reading.

A further object of this invention is to provide, in an indicating device of a type which includes a rectilinear scale and a tapered indicating member which intersects the scale at an angle, a lens for providing an image of the indicating member which is substantially perpendicular to the scale in all positions of the indicating member so that exact scale readings are at all times obtainable.

Another object of this invention is to provide a speedometer of the above type which can be installed in the curved or wrap-around portion of a vehicle dashboard.

Still a further object of this invention is to provide an indicating device of the above type which is simple in construction, economical to manufacture and accurately indicates the intelligence being measured.

Further objects, features and advantages of this invention will become apparent from a consideration of the following description, the appended claims, and the accompanying drawing in which:

Figure 1 is a front elevational view of the speedometer of this invention.

Fig. 2 is a side view of the speedometer of this invention, with a portion of the casing therefor broken away and with other parts of the speedometer shown in section for the purpose of clarity;

Fig. 3 is a fragmentary view, illustrated similarly to Fig. 2, of a modified form of the speedometer of this invention;

Fig. 4 is a plan view of another modified form of the speedometer of this invention;

Fig. 5 is a front elevational view of another modified form of the speedometer of this invention, with some parts broken away for the purpose of clarity;

Fig. 6 is a fragmentary sectional view looking along the line 6—6 in Fig. 5;

Fig. 7 is a front view of the form of the invention shown in Fig. 4; and

Fig. 8 is a side view with parts broken away of the form of the invention shown in Fig. 4.

The measuring device of this invention is illustrated in Figs. 1 and 2 incorporated in a speedometer 10 although it is to be understood that it is applicable to other types of indicating or measuring devices. The speedometer 10 includes a casing 12 which is mounted on the vehicle dashboard or some other suitable support. An upright dial plate 14 positioned within the casing 12 has an elongated substantially straight slot 16 and is provided with a scale 18 positioned directly above the slot 16. The scale 18 is provided with longitudinally spaced graduations 20 and indicia 22 denoting increments of speed.

Mounted in the casing 12 at a position forwardly of the dial plate and in a position retaining the dial plate 14 in the casing 12, is a transparent window 26 which is retained in the casing 12 by a retainer strip assembly 28.

The speedometer 10 may be operated by any suitable driving mechanism illustrated as a conventional magnetic driving mechanism 30, having one end 32 drivably connected to a speedometer cable and an opposite end which terminates in a drive shaft 34 on which an indicating member or needle 36 is mounted. An odometer mechanism 38 in the casing 12 is viewed through an opening 40 in the dial plate 14 and an opening 42 in a plate 44 arranged forwardly of the odometer 38.

As shown in Fig. 1, the indicating member 36 has the drive shaft 34 therefor located below the viewing slot 16 in a vertical plane 46 located substantially midway between the ends of the slot 16. Accordingly, in any indicating position of the indicating member 36 to either side of the plane 46, the portion of the indicating member 36 visible through the slot 16 is inclined relative to a vertical plane. Consequently, if the indicating member 36 is to be viewed directly, the exact reading on the scale 18 is in doubt for any of these positions.

In order to make a portion of the indicating member 36 that is visible through the slot 16 appear to be substantially perpendicular to the scale 18 throughout the entire range of movement of the indicating member, a rod-like lens 50 is mounted on the dial plate 14. The lens 50 is of a diameter somewhat larger than the width of the slot 16 so that only the central portion of the lens 50 is visible through the slot 16. Upper and lower mounting plates 52 and 54 on the back side of the dial plate 14 engage the top and bottom sides of the lens 50 and hold it in the desired position relative to the slot 16.

Since the lens is of a cylindrical shape, it must be considered to have a focal line rather than a focal point. In other words, each vertical planar portion of the lens 50, namely, each portion lying in a vertical plane, has a focal point in that plane and the locus of the focal points for all vertical planar portions of the lens is a straight line. Because the lens 50 is cylindrical, the focal line may be located at any position on an imaginary cylindrical surface concentric with the lens 50, depending on the direction of the parallel rays of light directed through the lens. The focal line referred to herein is the one diametrically across from the line parallel to the lens along which the lens 50 is normally observed by the vehicle driver. The exact location of the focal line will vary slightly for drivers of different size and for the same driver if he varies his sitting position so that the vertical location of his eyes is changed, but this variation is not of sufficient magnitude to affect the reading of the speedometer 10. The indicating member 36 and the lens 50 are located relative to each other so that the indicating member 36 moves in a plane which includes the focal line of the lens 50.

With this arrangement of the lens 50 and the indicating member visible through the slot 16 appears to be vertical to the longitudinal axis of the slot throughout the entire range of movement of the indicating member when viewed through the slot 16 and the lens 50, even through the indicating member is actually inclined to the longitudinal axis of the slot. The image of the indicating member 36 as it appears after having been straightened up by the lens 50 is indicated at 56 in Fig. 1. The upper and lower ends of the image 56, which are distorted, are disposed above and below the slot 16 and do not affect the visible portion of the image. It has been found that the image 56 tends to become thicker as it approaches the ends of the scale 18 when the pointer 36 is of a constant thickness measured lengthwise of the slot 16. In order to obtain an image 56 of substantially constant width, therefore, the pointer 36 is tapered inwardly in a direction toward the terminal end thereof.

A modified form of the speedometer of this invention is indicated at 10a in Fig. 3. In the speedometer 10a, a light source 60 is mounted on casing 12 at a position rearwardly of the indicating member 36 which is mounted so that it swings in a vertical plane rearwardly of, and parallel to the focal line of the lens 50. A curved translucent plate 62 is mounted on the dial plate 14 so that it is positioned between the indicating member 36 and the lens 50 and has a central portion located at the focal line of the lens 50. A shadow of the indicating member 36 is thus cast on the plate 62, which is formed of frosted glass or plastic, and this shadow is viewed through the lens 50 so that an image of the shadow like the image 56 is observed by the vehicle driver. The plate 62 is curved about the lens 50 so that for slight vertical variations of the line of observation of the lens 50, the plate has a portion which coincides with the focal line. It has been found that the image of the shadow is improved relative to the image 56.

In the modified form of the speedometer 10c illustrated in Figs. 4, 7 and 8, a cylindrical lens 50c, like the lens 50, is adapted to a wrap-around type instrument panel indicated diagrammatically at 70. The lens 50c is tapered over a major portion of its length so that the axis 72 of the lens 50c is curved and so that the locus of the focal points for vertical planar portions of the lens 50c is a straight line. This straight line lies in a plane occupied by a translucent plate 74, formed of frosted glass, plastic or the like and positioned adjacent the indicating member 36.

An inclined mirror 76 is located behind the indicating member 36 and is arranged relative to a light source, indicated diagrammatically at 78, so that light from the source 78 is reflected from the mirror 76 toward the plate 74 to project a shadow of the indicating member 36 on the plate 74. The image of the shadow on the plate 74 observable through the lens 50c thus appears as a straight line which is perpendicular to a scale, like the scale 18, associated with the instrument panel 70. It is to be understood that the light source 78 may be located at any convenient position for projecting a shadow of the member 36 on the plate 74, and if located directly behind the member 36 no mirror is required. In the preferred embodiment the source 78 is as illustrated to avoid extending the dimensions of the speedometer measured fore and aft of the vehicle.

Fig. 5 illustrates another modified form 10d of the speedometer of this invention. The speedometer 10d is of the rotating cylinder type and includes a cylinder member 80 driven by a driving mechanism 82 like the mechanism 30 in the speedometer 10. The cylinder member 80 is provided with a spiral line or member 84 and is located so that a vertical plane tangent to the front side on the cylinder is located at the local line of the lens 50 which may be of the curved type shown in Fig. 4 if desired. Since the line 84 is a spiral line, it necessarily is inclined relative to the scale 18 when viewed directly. In order to straighten the visible portion of the inclined line 84, the lens 50 is disposed so that the viewable portion of the line 84 is always located at a point on the focal line of the lens 86. Consequently, an upright image 88 is observed through the dial plate slot 16.

It will be understood that the specific constructions of the improved speedometers or similar measuring devices which are herein disclosed and described are presented for purposes of explanation and illustration and are not intended to indicate limits of the invention, the scope of which is defined by the following claims.

What is claimed is:

1. In an indicating device having a substantially horizontal scale and a movable indicating means arranged so that it intersects the scale at an angle in one moved position of the indicating means; longitudinally curved horizontal lens means arranged relative to said indicating means so that observation of the indicating means is through said lens means, said lens means being tapered so that the locus of the focal points for all vertical planar portions thereof is a substantially straight line, and means including a translucent plate located on said straight line, a mirror, and a light source cooperating with said mirror providing an image of said indicating means on said straight line so that when said indicating means is vewed through said lens it appears to be at substantially right angles to said scale in said one position of the indicating means.

2. In an indicating device having a longitudinally curved dial plate provided with an elongated rectangular slot extending longitudinally thereof, a substantially rectilinear scale adjacent the slot and on one side of said plate, an indicating member operatively associated with the scale and mounted for angular movement about an axis spaced transversely of said slot, means providing for an image of said indicating member in a plane to one side of said plate, said indicating member being mounted so that it intersects the longitudinal axis of said slot at an angle other than ninety degrees throughout the major portion of the movement of said indicating member with respect to said slot, an elongated lens member of a diameter larger than the width of the slot and longitudinally curved to conform to the curvature of said slot positioned adjacent said slot on the opposite side thereof so that only a central portion of the lens is visible through said slot when observing the scale, said lens member having longitudinally spaced planar portions thereof formed of different diameters so that the locus of the focal points of said planar portions is a straight line, said lens member being located so that the focal line thereof is in said plane so that the lens is effective to erect the image of said indicating member when the indicating member is viewed through the lens member and said slot so that the indicating member appears to intersect the longitudinal axis of the slot at substantially right angles throughout the entire range of movement of the indicating member relative to the slot.

3. In an indicating device having a relatively flat dial plate provided with an elongated rectangular slot, a substantially rectilinear scale adjacent the slot, an indicating member operatively associated with the scale and mounted for angular movement about an axis spaced transversely of said slot, said indicating member being mounted so that it intersects the longitudinal axis of said slot at an angle other than ninety degrees throughout the major portion of the movement of said indicating member with respect to said slot, light and translucent plate means providing a shadow of said indicating member, and lens means positioned adjacent said slot and relative to said shadow so that the shadow is visible through said lens means, said lens means being effective to erect the image of said shadow when the shadow is viewed through the lens means and said slot so that the indicating member appears to intersect the longitudinal axis of the slot at substantially right angles throughout the entire range of movement of the indicating member relative to the slot.

4. In an indicating device having a substantially rectilinear scale and indicating means mounted for movement relative to the scale such that during a portion of the range of indicating movement therefor said indicating means intersects said scale at an angle other than ninety degrees, a cylindrical lens member positioned adjacent said scale, light and mirror means positioned on one side of said indicating means for directing light against the indicating member, a translucent member on the opposite side of the indicating means having a shadow of the indicating means projected thereon, means masking the opposite edges of the lens from view so that only a central portion thereof is visible on viewing of said scale, said lens being arranged such that the portion of said shadow viewable therethrough in all positions of the indicating means is positioned substantially on a focal line of the lens so that the image of the shadow of the indicating means observable through the lens is perpendicular to said scale.

5. In an indicating device for an upright instrument panel which is horizontally curved, a substantially horizontal elongated slot in said curved panel, a substantially horizontal scale adjacent said slot, and indicating means mounted for movement in a vertical plane to one side of slot, the combination of elongated lens means disposed in said slot and curved in a direction longitudinally thereof so that it corresponds to the curvature of said slot, said leans means having longitudinally spaced vertical planar portions thereof formed of different diameters so that the locus of the focal points of said planar portions is a straight line parallel to the vertical plane of movement of said indicating means and is arranged in a predetermined relation therewith so that an image of said indicating means visible at said lens means is substantially perpendicular to said slot for all moved positions of the indicating means.

References Cited in the file of this patent
UNITED STATES PATENTS

| | | |
|---|---|---|
| 1,761,947 | Wedin | June 3, 1930 |
| 1,899,804 | Hopfield | Feb. 28, 1933 |

UNITED STATES PATENT OFFICE

CERTIFICATE OF CORRECTION

Patent No. 2,943,595                     July 5, 1960

Smith B. Atwood, Jr.

It is hereby certified that error appears in the printed specification of the above numbered patent requiring correction and that the said Letters Patent should read as corrected below.

Column 4, line 5, for "local" read -- focal --.

Signed and sealed this 20th day of December 1960.

(SEAL)
Attest:

KARL H. AXLINE
Attesting Officer

ROBERT C. WATSON
Commissioner of Patents